(12) United States Patent
Panusopone et al.

(10) Patent No.: US 9,380,319 B2
(45) Date of Patent: Jun. 28, 2016

(54) IMPLICIT TRANSFORM UNIT REPRESENTATION

(75) Inventors: Krit Panusopone, San Diego, CA (US); Xue Fang, San Diego, CA (US); Limin Wang, San Diego, CA (US)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 1193 days.

(21) Appl. No.: 13/328,965

(22) Filed: Dec. 16, 2011

(65) Prior Publication Data

US 2012/0201298 A1     Aug. 9, 2012

Related U.S. Application Data

(60) Provisional application No. 61/439,659, filed on Feb. 4, 2011.

(51) Int. Cl.
| | |
|---|---|
| *H04N 7/50* | (2006.01) |
| *H04N 19/61* | (2014.01) |
| *H04N 19/159* | (2014.01) |
| *H04N 19/176* | (2014.01) |
| *H04N 19/46* | (2014.01) |
| *H04N 19/122* | (2014.01) |
| *H04N 7/32* | (2006.01) |

(Continued)

(52) U.S. Cl.
CPC .............. *H04N 19/61* (2014.11); *H04N 19/122* (2014.11); *H04N 19/159* (2014.11); *H04N 19/176* (2014.11); *H04N 19/46* (2014.11)

(58) Field of Classification Search
CPC ....... H04N 7/50; H04N 7/30; H04N 7/26244; H04N 7/2625; H04N 7/26127
USPC ..................................................... 375/240.12
See application file for complete search history.

(56) References Cited

U.S. PATENT DOCUMENTS

| | | | |
|---|---|---|---|
| 4,774,574 | A | 9/1988 | Daly et al. |
| 5,068,724 | A | 11/1991 | Krause et al. |

(Continued)

FOREIGN PATENT DOCUMENTS

| | | |
|---|---|---|
| JP | 2010199959 | 9/2010 |
| WO | WO2010039015 | 4/2010 |

(Continued)

OTHER PUBLICATIONS

B. Bross, W.-J Han, J.-R. Ohm, G. J. Sullivan, T. Wiegand: "High efficiency video coding (HEVC) text specification draft 7", Document of Joint Collaborative Team on Video Coding, JCTVC-I1003-d4, Apr. 27-May 7, 2012.

(Continued)

*Primary Examiner* — Sath V Perungavoor
*Assistant Examiner* — Howard D Brown, Jr.
(74) *Attorney, Agent, or Firm* — Young Basile Hanlon & MacFarlane P.C.

(57) ABSTRACT

In one embodiment, a method includes receiving a size of a coding unit (CU) for a block of video content. Information associated with a prediction unit (PU) type for a prediction unit of the coding unit is also received. The method then applies the size of the coding unit and the information associated with the prediction unit type to a function to determine a size of at least one transform unit for the prediction unit. The size of the at least one transform unit is outputted for use in a transform operation.

20 Claims, 6 Drawing Sheets

(51) Int. Cl.
*H04N 7/30* (2006.01)
*H04N 7/26* (2006.01)

(56) References Cited

U.S. PATENT DOCUMENTS

| | | | |
|---|---|---|---|
| 5,091,782 A | 2/1992 | Krause et al. | |
| 5,121,216 A | 6/1992 | Chen et al. | |
| 5,146,324 A | 9/1992 | Miller et al. | |
| 5,224,062 A | 6/1993 | McMillan, Jr. et al. | |
| 5,235,623 A | 8/1993 | Sugiyama et al. | |
| 5,260,782 A | 11/1993 | Hui | |
| 5,274,442 A | 12/1993 | Murakami et al. | |
| 5,341,440 A | 8/1994 | Earl et al. | |
| 5,422,963 A | 6/1995 | Chen et al. | |
| 5,444,800 A | 8/1995 | Kim | |
| 5,635,938 A | 6/1997 | Komoto | |
| 5,737,020 A | 4/1998 | Hall et al. | |
| 5,767,908 A | 6/1998 | Choi | |
| 5,872,866 A * | 2/1999 | Strongin et al. | 382/233 |
| 5,903,669 A | 5/1999 | Hirabayashi | |
| 6,108,383 A | 8/2000 | Miller et al. | |
| 6,115,501 A | 9/2000 | Chun et al. | |
| 6,134,350 A | 10/2000 | Beck | |
| 6,167,161 A | 12/2000 | Oami | |
| 6,408,025 B1 | 6/2002 | Kaup | |
| 6,522,783 B1 | 2/2003 | Zeng et al. | |
| 6,522,784 B1 | 2/2003 | Zlotnick | |
| 6,683,991 B1 | 1/2004 | Andrew et al. | |
| 6,819,793 B1 | 11/2004 | Reshetov et al. | |
| 6,917,651 B1 | 7/2005 | Yoo et al. | |
| 6,934,419 B2 | 8/2005 | Zlotnick | |
| 7,266,149 B2 | 9/2007 | Holcomb et al. | |
| 7,292,634 B2 | 11/2007 | Yamamoto et al. | |
| 7,492,823 B2 | 2/2009 | Lee et al. | |
| 7,894,530 B2 | 2/2011 | Gordon et al. | |
| 7,912,318 B2 | 3/2011 | Nakayama | |
| 7,936,820 B2 | 5/2011 | Watanabe et al. | |
| 8,000,546 B2 | 8/2011 | Yang et al. | |
| 8,094,950 B2 | 1/2012 | Sasagawa | |
| 8,582,656 B2 | 11/2013 | Lin et al. | |
| 8,687,699 B1 | 4/2014 | Wen | |
| 2002/0168114 A1 | 11/2002 | Valente | |
| 2002/0196983 A1 | 12/2002 | Kobayashi | |
| 2003/0048943 A1 | 3/2003 | Ishikawa | |
| 2003/0146925 A1 | 8/2003 | Zhao et al. | |
| 2004/0057519 A1 | 3/2004 | Yamamoto et al. | |
| 2004/0125204 A1* | 7/2004 | Yamada | H04N 19/197 348/97 |
| 2004/0179820 A1 | 9/2004 | Kashiwagi et al. | |
| 2004/0184537 A1 | 9/2004 | Geiger et al. | |
| 2005/0053151 A1 | 3/2005 | Lin et al. | |
| 2005/0147163 A1 | 7/2005 | Li et al. | |
| 2005/0249291 A1 | 11/2005 | Gordon et al. | |
| 2006/0045368 A1 | 3/2006 | Mehrotra | |
| 2006/0098738 A1* | 5/2006 | Cosman | H04N 19/159 375/240.16 |
| 2006/0115168 A1* | 6/2006 | Kobayashi | H04N 19/176 382/239 |
| 2006/0133682 A1 | 6/2006 | Tu et al. | |
| 2006/0210181 A1 | 9/2006 | Wu et al. | |
| 2006/0239575 A1 | 10/2006 | Abe et al. | |
| 2006/0251330 A1* | 11/2006 | Toth | H04N 19/52 382/236 |
| 2007/0036223 A1 | 2/2007 | Srinivasan | |
| 2007/0078661 A1 | 4/2007 | Sriram et al. | |
| 2007/0140349 A1 | 6/2007 | Burazerovic | |
| 2007/0183500 A1 | 8/2007 | Nagaraj et al. | |
| 2007/0201554 A1* | 8/2007 | Sihn | H04N 19/14 375/240.12 |
| 2007/0211953 A1 | 9/2007 | Sasagawa | |
| 2007/0223583 A1 | 9/2007 | Nagai et al. | |
| 2008/0008246 A1 | 1/2008 | Mukherjee et al. | |
| 2008/0043848 A1 | 2/2008 | Kuhn | |
| 2008/0084929 A1 | 4/2008 | Li | |
| 2008/0123736 A1 | 5/2008 | Sekiguchi et al. | |
| 2008/0123947 A1 | 5/2008 | Moriya et al. | |
| 2008/0123977 A1* | 5/2008 | Moriya et al. | 382/238 |
| 2008/0253463 A1 | 10/2008 | Lin et al. | |
| 2008/0310512 A1* | 12/2008 | Ye | H04N 19/00812 375/240.16 |
| 2009/0041128 A1 | 2/2009 | Howard | |
| 2009/0049641 A1 | 2/2009 | Pullins et al. | |
| 2009/0067503 A1 | 3/2009 | Jeong et al. | |
| 2009/0122864 A1* | 5/2009 | Palfner | H04N 19/176 375/240.12 |
| 2009/0123066 A1 | 5/2009 | Moriya et al. | |
| 2009/0228290 A1 | 9/2009 | Chen et al. | |
| 2009/0274382 A1 | 11/2009 | Lin et al. | |
| 2010/0020867 A1 | 1/2010 | Wiegand et al. | |
| 2010/0086049 A1* | 4/2010 | Ye | H04N 19/176 375/240.16 |
| 2010/0246951 A1 | 9/2010 | Chen et al. | |
| 2010/0290520 A1 | 11/2010 | Kamisli et al. | |
| 2010/0309286 A1* | 12/2010 | Chen et al. | 348/43 |
| 2011/0032983 A1 | 2/2011 | Sezer | |
| 2011/0090959 A1* | 4/2011 | Wiegand | H04N 19/593 375/240.12 |
| 2011/0182352 A1 | 7/2011 | Pace | |
| 2011/0206135 A1* | 8/2011 | Drugeon | H04N 19/176 375/240.24 |
| 2011/0268183 A1* | 11/2011 | Sole | H04N 19/70 375/240.03 |
| 2011/0274162 A1* | 11/2011 | Zhou | H04N 19/176 375/240.03 |
| 2011/0286516 A1 | 11/2011 | Lim et al. | |
| 2011/0293009 A1 | 12/2011 | Steinberg et al. | |
| 2012/0008683 A1* | 1/2012 | Karczewicz | H04N 19/159 375/240.12 |
| 2012/0057630 A1 | 3/2012 | Saxena et al. | |
| 2012/0128066 A1 | 5/2012 | Shibahara et al. | |
| 2012/0163455 A1* | 6/2012 | Zheng et al. | 375/240.13 |
| 2012/0177116 A1 | 7/2012 | Panusopone et al. | |
| 2012/0230418 A1 | 9/2012 | Sole Rojals et al. | |
| 2013/0003859 A1* | 1/2013 | Karczewicz | H04N 19/70 375/240.24 |
| 2013/0034152 A1* | 2/2013 | Song et al. | 375/240.03 |
| 2013/0070845 A1* | 3/2013 | Lim | H04N 19/00296 375/240.03 |
| 2013/0089138 A1* | 4/2013 | Guo | H04N 19/00121 375/240.03 |
| 2014/0010295 A1 | 1/2014 | Lu et al. | |
| 2014/0092956 A1* | 4/2014 | Panusopone | H04N 19/00781 375/240.02 |

FOREIGN PATENT DOCUMENTS

| | | |
|---|---|---|
| WO | WO2010039288 | 4/2010 |
| WO | 2011049397 A2 | 4/2011 |

OTHER PUBLICATIONS

Bankoski et al. "Technical Overview of VP8, an Open Source Video Codec for the Web". Dated Jul. 11, 2011.
Bankoski et al. "VP8 Data Format and Decoding Guide" Independent Submission. RFC 6389, Dated Nov. 2011.
Bankoski et al. "VP8 Data Format and Decoding Guide; draft-bankoski-vp8-bitstream-02" Network Working Group. Internet-Draft, May 18, 2011, 288 pp.
Chen J et al. "Description of scalable video coding technology proposal by Qualcomm (configuration)", 11. JCT-VC Meeting; 102. MPEG Meeting; Oct. 10, 2012 Oct. 19, 2012; Shanghai; (Joint Collaborative Team on Video Coding of ISO/IEC JTC1/SC29/WG11 and ITU-T SG.16); URL:HTTP://WFTP3.ITU.INT/AV-ARCH/JCTVC-SITE/, No. JCTVC-K0035, Oct. 2, 2012, all pages.
Chen J. et al., "TE:Simulation results for various max. number of transform quadtree depth," MPEG Meeting, Guangzhou, Chima; No. M18236; Oct. 28, 2010.
Chen P. et al., "Video coding using extended block sizes," VCEG Meeting, San Diego, US; No. VCEG-AJ23, Oct. 15, 2008.
Guo L et al.: "Transform Selection for Inter-Layer Texture Prediction in Scalable Video Coding", 11. JCT-VC Meeting; 102; MPEG Meeting; Oct. 10-19, 2012; Shanghai; (Joint Collaborative Team on Video

(56) References Cited

OTHER PUBLICATIONS

Coding of ISO/IEC JTC1/WG11 and ITU-T SG.16); URL:HTTP://WFTP3.ITU.INT/AV-ARCH/JCTVC-SITE/,, No. JCTVC-K0321, Oct. 7, 2012, all pages.

Han et al., "Jointly Optimized Spatial Prediction and Block Transform for Video and Image Coding," IEEE Transactions on Image Processing, vol. 21, No. 4 (Apr. 2012).

Han et al., "Toward Jointly Optimal Spatial Prediction and Adaptive Transform in Video/Image Coding," ICASSP 2010 (Dallas, TX, Mar. 14-19, 2010).

Implementors' Guide; Series H: Audiovisual and Multimedia Systems; Coding of moving video: Implementors Guide for H.264: Advanced video coding for generic audiovisual services. H.264. International Telecommunication Union. Version 12. Dated Jul. 30, 2010.

ISR and Written Opinion of the International Searching Authority, for Int'l Application No. PCT/US2012/020167; Mar. 29, 2012.

ISR, & Written Opinion of the International Searching Authority for International Application No. ISR/US2013/062216 (cs39797), Dec. 12, 2013, 12 pages.

Krit Panusopone, et al. "Efficient Transform Unit Representation," Joint Collaborative Team on Video Coding (JCT-VC) of UTU-T SG16 WP3 and ISO/IEC JTC1/SC29/WG11 4nd Meeting: Daegu, KR, Jan. 22, 2011.

Lee B. et al., "Hierarchical variable block transform," JCT-VC Meeting, Geneva, Switzerland; No. JCTVC-B050; Jul. 24, 2010.

Lee T et al.: "TE12.1: Experimental results of transform unit quadtree/2-level test", 3 JCT-VC Meeting; 94. MPEG Meeting; Jul. 10-15, 2010; Guangzhou; (Joint Collaborative Team on Video Coding of ISO/IEC JTC1/SC29/WG11 and ITU-T SG.16); URL:HTTP://WFTP3.ITU.INT/AV-ARCH/JCTVC-SITE/,, No. JCTVC-C200, Oct. 2, 2010, all pages.

VP8 Data Format and Decoding Guide. WebM Project. Google On2. Dated: Dec. 1, 2010.

Mozilla, "Introduction to Video Coding Part 1: Transform Coding", Video Compression Overview, Mar. 2012, 171 pp.

Overview; VP7 Data Format and Decoder. Version 1.5. On2 Technologies, Inc. Dated Mar. 28, 2005.

Rath G. et al.: "Improv pred & transform for spatial scalability", 20. JVT Meeting; 77. MPEG Meeting, Jul. 15-21, 2006; Kalgenfurt, AT; (Joing Video Team of ISO/IEC JTC1/SC29/WG11 and ITU-TSG. 16), No. JVT-T082, Jul. 16, 2006, all pages.

Saxena A et al.: "On secondary transforms for Intra BVL residue", 13. JCT-VC Meeting; 104. MPEG Meeting; Apr. 18-26, 2013; Incheon; (Joint Collaborative Team on Video Coding of ISO/IEC JTC1/SC29/WG11 and ITU-T SG.16); URL:HTTP://WFTP3.ITU.INT/AV-ARCH/JCTVC-SITE/, No. JCTVC-M0033, Apr. 9, 2013, all pages.

Saxena A et al.: "On secondary transforms for intra/inter prediction residual", 9. JCT-VC Meeting; 100. MPEG Meeting; Apr. 27-May 7, 2012; Geneva; (Joint Collaborative Team on Video Coding of ISO/IEC JTC1/SC29/WG11 and ITU-T SG.16); URL:HTTP://WFTP3.ITU.INT/AV-ARCH/JCTVC-SITE/,, No. JCTVC-10232, Apr. 17, 2012, all pages.

Series H: Audiovisual and Multimedia Systems; Infrastructure of audiovisual services—Coding of moving video. H.264. Advanced video coding for generic audiovisual services. International Telecommunication Union. Version 11. Dated Mar. 2009.

Series H: Audiovisual and Multimedia Systems; Infrastructure of audiovisual services—Coding of moving video. H.264. Advanced video coding for generic audiovisual services. International Telecommunication Union. Version 12. Dated Mar. 2010.

Series H: Audiovisual and Multimedia Systems; Infrastructure of audiovisual services—Coding of moving video. H.264. Amendment 2: New profiles for professional applications. International Telecommunication Union. Dated Apr. 2007.

Series H: Audiovisual and Multimedia Systems; Infrastructure of audiovisual services—Coding of moving video. H.264. Advanced video coding for generic audiovisual services. Version 8. International Telecommunication Union. Dated Nov. 1, 2007.

Series H: Audiovisual and Multimedia Systems; Infrastructure of audiovisual services—Coding of moving video; Advanced video coding for generic audiovisual services. H.264. Amendment 1: Support of additional colour spaces and removal of the High 4:4:4 Profile. International Telecommunication Union. Dated Jun. 2006.

Series H: Audiovisual and Multimedia Systems; Infrastructure of audiovisual services—Coding of moving video; Advanced video coding for generic audiovisual services. H.264. Version 1. International Telecommunication Union. Dated May 2003.

Series H: Audiovisual and Multimedia Systems; Infrastructure of audiovisual services—Coding of moving video; Advanced video coding for generic audiovisual services. H.264. Version 3. International Telecommunication Union. Dated Mar. 2005.

Sikora, T. et al., Shape-adaptive DCT for generic coding of video, Circuits and Systems for Video Technology, IEEE Transactions on vol. 5, Issue 1, p. 59-62, Feb. 1, 1995.

VP6 Bitstream & Decoder Specification. Version 1.02. On2 Technologies, Inc. Dated Aug. 17, 2006.

VP6 Bitstream & Decoder Specification. Version 1.03. On2 Technologies, Inc. Dated Oct. 29, 2007.

Wiegand et al. "BoG report: residual quadtree structure" JCTVC-C319_r1, Guangzhou, CN Oct. 2010.

Mccann K. et al.; "Video coding technology proposal by Samsung (and BBC)," JCT-VC Meeting; Dresden, Germany, Apr. 15, 2010.

Panusopone et al., "Efficient transform unit representation," MPEG Meeting ISO/IEC JTC1/SC29/WG11 No. m19013, Jan. 22, 2011.

Patent Cooperation Treaty, "International Search Report and Written Opinion of the International Searching Authority," for Int'l Application No. PCT/US2012/021475; Mar. 29, 2012.

T. Wiegand, H. Schwarz, B. Brozz, A. Fuldseth, X. Wang, W.-J. Han, "BoG report: residaul quadtree structure," JCTVC-C319_r1, Guangzhou, CN, Oct. 2010.

B. Bross, H. Kirchoffer, H. Schwarz, T. Wiegand, "Fast intra encoding for fixed maximum depth of transform quadtree," JCTVC-C311_r1, Guangzhou, CN, Oct. 2010.

T. Wiegand, B. Bross, J. Ohm, G. Sullivan, "WD1: Working Draft 1 of High-Efficiency Video Coding," JCTVC-C403, Guangzhou, CN, Oct. 7-15, 2010.

* cited by examiner

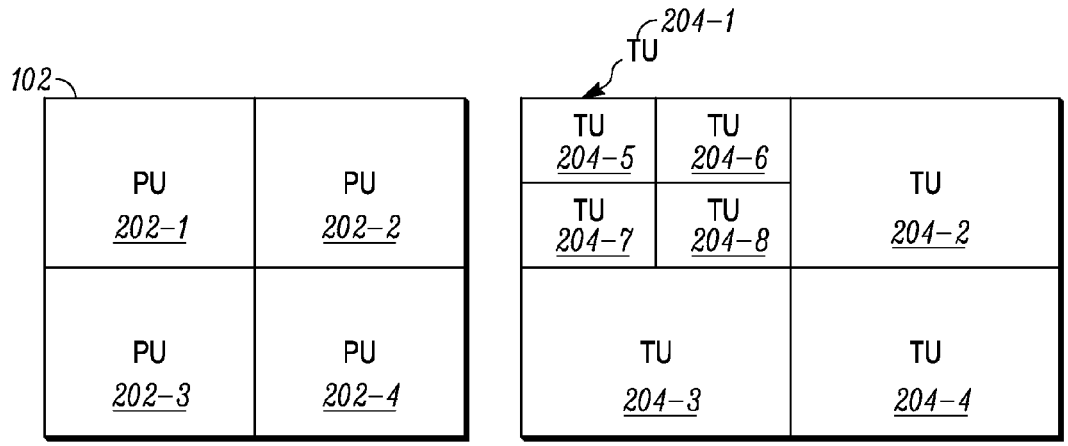
PRIOR ART
FIG. 2A
PRIOR ART
FIG. 2B
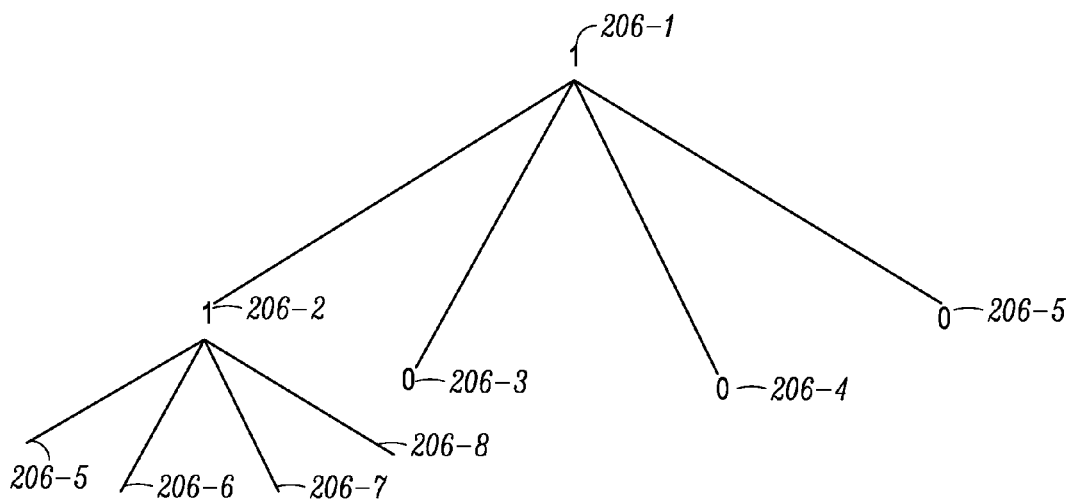
PRIOR ART
FIG. 2C

IMPLICIT TRANSFORM UNIT REPRESENTATION

CROSS REFERENCE TO RELATED APPLICATIONS

The present application claims priority to U.S. Provisional App. No. 61/439,659 for "Implicit Transform Unit Representation" filed Feb. 11, 2011, the contents of which is incorporated herein by reference in their entirety.

The present application is related to U.S. application Ser. No. 13/328,948 for "Efficient Transform Unit Representation" filed concurrently, the contents of which are incorporated herein by reference in their entirety.

BACKGROUND

Particular embodiments generally relate to video compression.

Video compression systems employ block processing for most of the compression operations. A block is a group of neighboring pixels and may be treated as one coding unit in terms of the compression operations. Theoretically, a larger coding unit is preferred to take advantage of correlation among immediate neighboring pixels. Various video compression standards, e.g., Motion Picture Expert Group (MPEG)-1, MPEG-2, and MPEG-4, use block sizes of 4×4, 8×8, and 16×16 (referred to as a macroblock (MB)). The standards typically use a fixed transform size (e.g., 4×4 or 8×8) in a macro block. However, if more than one transform size is used, then a macroblock level parameter may be required to indicate which transform size to use. Including this parameter increases the overhead as the macroblock level parameter needs to be encoded.

High efficiency video coding (HEVC) is also a block-based hybrid spatial and temporal predictive coding scheme. HEVC partitions an input picture into square blocks referred to as largest coding units (LCUs). Each LCU can be partitioned into smaller square blocks called coding units (CUs). FIG. 1a shows an example of an LCU partition of CUs. An LCU 100 is first partitioned into four CUs 102. Each CU 102 may also be further split into four smaller CUs 102 that are a quarter of the size of the CU 102. This partitioning process can be repeated based on certain criteria, such as limits to the number of times a CU can be partitioned may be imposed. As shown, CUs 102-1, 102-3, and 102-4 are a quarter of the size of LCU 100. Further, a CU 102-2 has been split into four CUs 102-5, 102-6, 102-7, and 102-8.

A quadtree data representation is used to describe how LCU 100 is partitioned into CUs 102. FIG. 1b shows a quadtree 104 of the LCU partition shown in FIG. 1a. Each node of quadtree 104 is assigned a flag of "1" if the node is further split into four sub-nodes and assigned a flag of "0" if the node is not split. The flag is called a split bit (e.g. 1) or stop bit (e.g., 0) and is coded in a compressed bitstream.

A node 106-1 includes a flag "1" at a top CU level because LCU 100 is split into 4 CUs. At an intermediate CU level, the flags indicate whether a CU 102 is further split into four CUs. In this case, a node 106-3 includes a flag of "1" because CU 102-2 has been split into four CUs 102-5-102-8. Nodes 106-2, 106-4, and 106-5 include a flag of "0" because these CUs 102 are not split. Nodes 106-6, 106-7, 106-8, and 106-9 are at a bottom CU level and hence, no flag bit of "0" or '1" is necessary for those nodes because corresponding CUs 102-5-102-8 are not split. The quadtree data representation for quadtree 104 shown in FIG. 1b may be represented by the binary data of "10100", where each bit represents a node 106 of quadtree 104. The binary data indicates the LCU partitioning to the encoder and decoder, and this binary data needs to be coded and transmitted as overhead.

HEVC uses a block transform of either a square or non-square. Each CU 102 may include one or more prediction units (PUs). The PUs may be used to perform spatial prediction or temporal prediction. PU type specifies size of a PU in relation with CU size. For example, a PU with PU type 2N×2N has the same size as its corresponding CU.

FIG. 2a shows an example of a CU partition of PUs. As shown, a CU 102 has been partitioned into four PUs 202-1-202-4. Unlike prior standards where only one transform of 8×8 or 4×4 is applied to a macroblock, a set of block transforms of different sizes may be applied to a CU 102. For example, the CU partition of PUs 202 shown in FIG. 2a may be associated with a set of transform units (TUs) 204 shown in FIG. 2b. In FIG. 2b, PU 202-1 is partitioned into four TUs 204-5-204-8. Also, TUs 204-2, 204-3, and 204-4 are the same size as corresponding PUs 202-2-202-4. Because the size and location of each block transform within a CU may vary, another quadtree data representation, referred to as a residual quadtree (RQT), is needed to describe the TU partitioning. FIG. 2c shows an example of an RQT. The RQT is derived in a similar fashion as described with respect to quadtree 104 for the LCU partitioning. For example, each node of the RQT may include a flag of "1" if CU 102 is split into more than one TU 204. A node 206-1 includes a flag of "1" because CU 102 is split into four TUs 204. Also, node 206-2 has a flag of "1" because TU 204-1 is split into four TUs 204-5-204-8. All other nodes 206 have a flag of "0" because TUs 204-2, 204-3, and 204-4 are not split. For the RQT data representation, binary data of "11000" also has to be encoded and transmitted as overhead. Having to encode and transmit the RQT data representation may be undesirable due to the added overhead and complexity.

SUMMARY

In one embodiment, a method includes receiving a size of a coding unit (CU) for a block of video content. Information associated with a prediction unit (PU) type for a prediction unit of the coding unit is also received. The method then applies the size of the coding unit and the information associated with the prediction unit type to a function to determine a size of at least one transform unit for the prediction unit. The size of the at least one transform unit is outputted for use in a transform operation.

In one embodiment, an apparatus includes one or more computer processors and a computer-readable storage medium comprising instructions for controlling the one or more computer processors to be operable to: receive a size of a coding unit (CU) for a block of video content; receive information associated with a prediction unit (PU) type for a prediction unit of the coding unit; apply the size of the coding unit and the information associated with the prediction unit type to a function to determine a size of at least one transform unit for the prediction unit; and output the size of the at least one transform unit for use in a transform operation.

In one embodiment, a non-transitory computer-readable storage medium is provided comprising instructions for controlling the one or more computer processors to be operable to: receive a size of a coding unit (CU) for a block of video content; receive information associated with a prediction unit (PU) type for a prediction unit of the coding unit; apply the size of the coding unit and the information associated with the prediction unit type to a function to determine a size of at least one transform unit for the prediction unit; and output the size of the at least one transform unit for use in a transform operation.

The following detailed description and accompanying drawings provide a more detailed understanding of the nature and advantages of the present invention.

BRIEF DESCRIPTION OF THE DRAWINGS

FIG. 2A shows an example of a CU partition of PUs

FIG. 2B shows a PU partitioning of a set of transform units (TUs).

FIG. 2C shows an example of an RQT.

DETAILED DESCRIPTION

Described herein are techniques for a video compression system. In the following description, for purposes of explanation, numerous examples and specific details are set forth in order to provide a thorough understanding of embodiments of the present invention. Particular embodiments as defined by the claims may include some or all of the features in these examples alone or in combination with other features described below, and may further include modifications and equivalents of the features and concepts described herein.

Figure 1A:
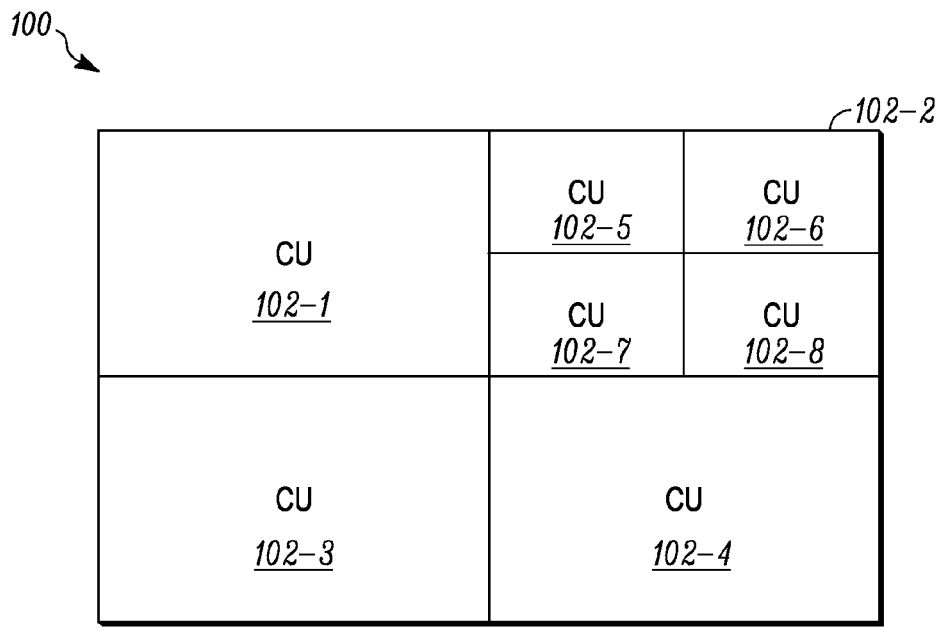
FIG. 1A shows an example of an LCU partition.
Figure 1B:
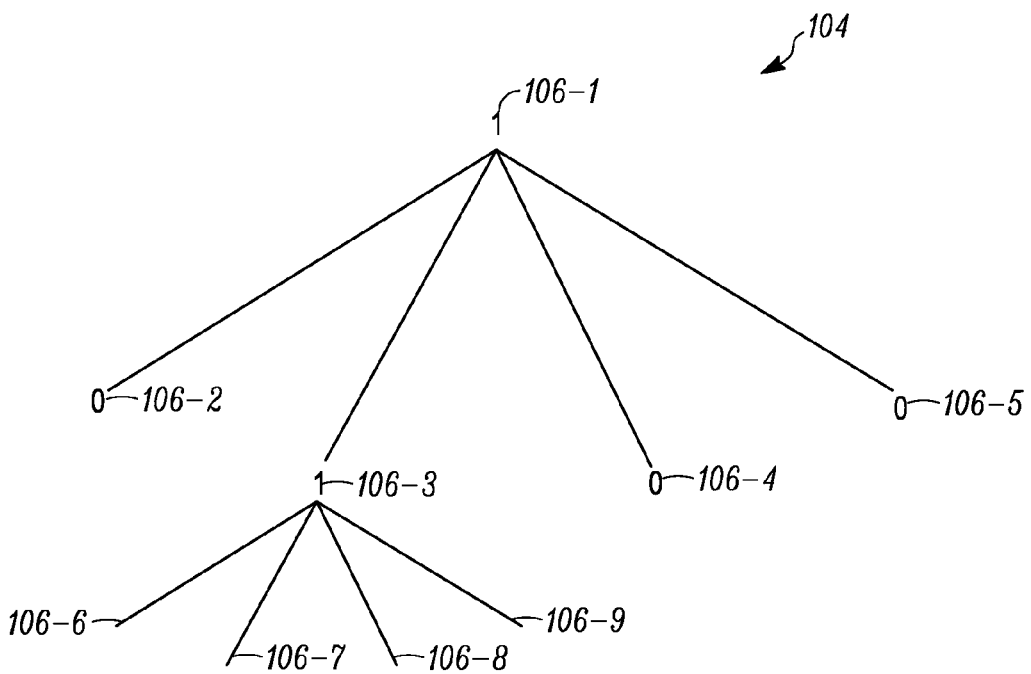
FIG. 1B shows a quadtree of the LCU partition shown in FIG. 1A.
Figure 3A:
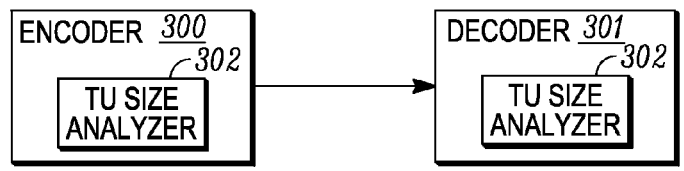
FIG. 3A depicts an example of a system for encoding and decoding video content according to one embodiment.

FIG. 3A depicts an example of a system for encoding and decoding video content according to one embodiment. The system includes an encoder 300 and a decoder 301, both of which will be described in more detail below.

Particular embodiments reduce overhead by using a function to determine a size of a transform unit (TU) based on a prediction unit (PU) type and a coding unit (CU) size. In one embodiment, using the function avoids encoding of a residual quadtree (RQT) data representation for the TU partitioning.

Encoder 300 and decoder 301 use an implicit transform unit representation to determine the TU size instead of using the RQT data representation. The implicit transform unit representation may remove the overhead and complexity associated with the RQT data representation. In one example, TU size analyzer 302 uses a relationship between the size of the CU and the PU type to determine the TU size. For example, TU size analyzer 302 applies a variable T to a function to determine the TU size without using the RQT. Using the function and the variable T may reduce the overhead and complexity. A transform block then uses the TU size in a transform operation, which is described in more detail below. The TU size analysis may be performed by both encoder 300 and decoder 301.

Figure 3B:
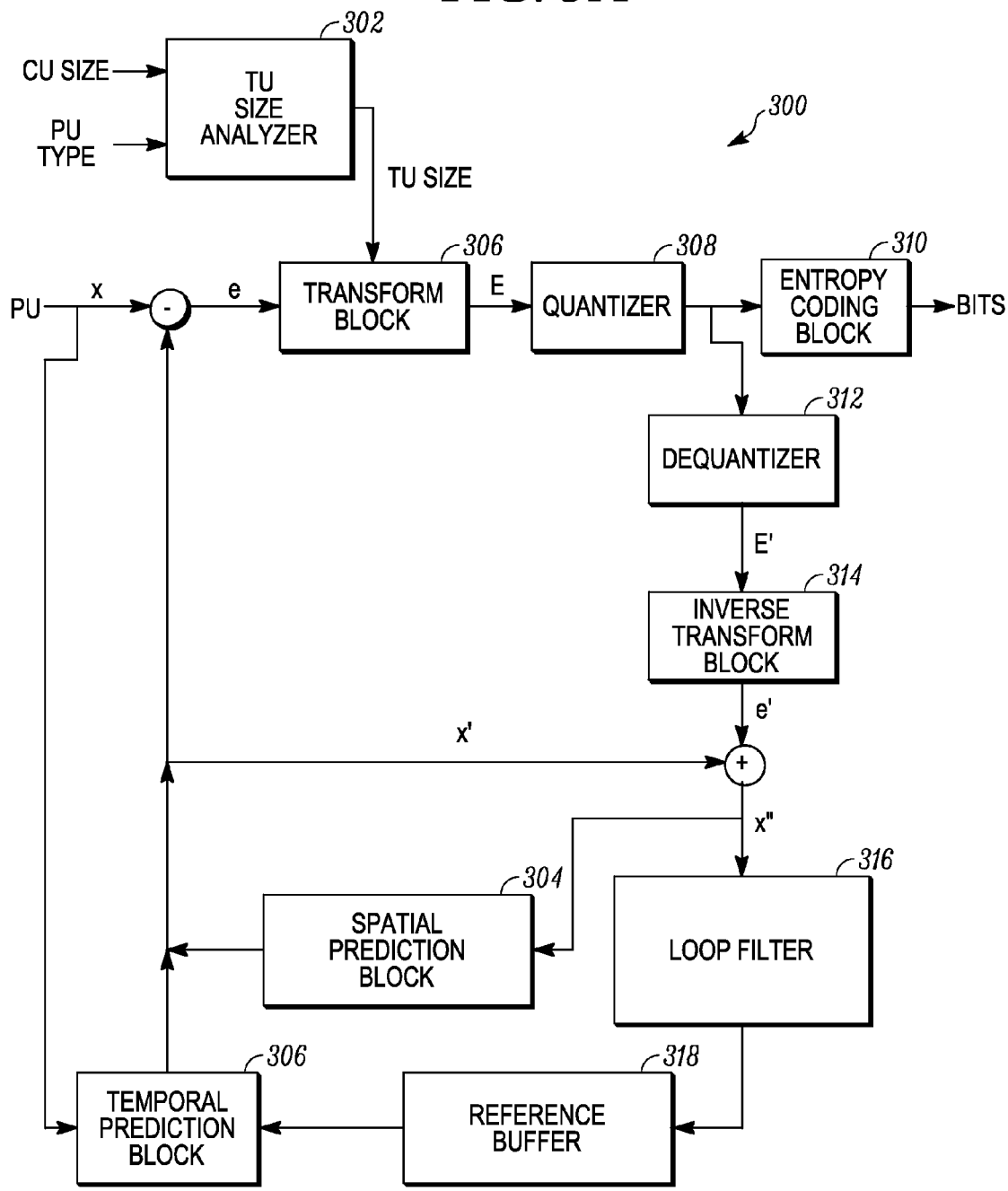
FIG. 3B depicts an example of an encoder according to one embodiment.

FIG. 3B depicts an example of an encoder 300 according to one embodiment. TU size analyzer 302 is used to output a TU size to a transform block 306. TU size analyzer 302 receives a CU size and a PU type. The size of the CU (e.g., 64×64, 32×32, etc.) is associated with the PU being encoded. The PU type may be determined based on the dimensions of the PU being encoded (e.g., 2N×2N, 2N×N, N×2N, or N×N).

A general operation of encoder 300 will now be described. It will be understood that variations on the encoding process described will be appreciated by a person skilled in the art based on the disclosure and teachings herein.

For a current PU, x, a prediction PU, x', is obtained through either spatial prediction or temporal prediction. The prediction PU is then subtracted from the current PU, resulting in a residual PU, e. A spatial prediction block 304 may include different spatial prediction directions per PU, such as horizontal, vertical, 45-degree diagonal, 135-degree diagonal, DC (flat averaging), and planar.

A temporal prediction block 306 performs temporal prediction through a motion estimation operation. The motion estimation operation searches for a best match prediction for the current PU over reference pictures. The best match prediction is described by a motion vector (MV) and associated reference picture (refIdx). The motion vector and associated reference picture are included in the coded bit stream.

Transform block 306 performs a transform operation with the residual PU, e. Transform block 306 outputs the residual PU in a transform domain, E. The transform process using the TU size outputted by TU size analyzer 302 will be described in more detail below.

A quantizer 308 then quantizes the transform coefficients of the residual PU, E. Quantizer 308 converts the transform coefficients into a finite number of possible values. Entropy coding block 310 entropy encodes the quantized coefficients, which results in final compression bits to be transmitted. Different entropy coding methods may be used, such as context-adaptive variable length coding (CAVLC) or context-adaptive binary arithmetic coding (CABAC).

Also, in a decoding process within encoder 300, a de-quantizer 312 de-quantizes the quantized transform coefficients of the residual PU. De-quantizer 312 then outputs the de-quantized transform coefficients of the residual PU, e'. An inverse transform block 314 receives the de-quantized transform coefficients, which are then inverse transformed resulting in a reconstructed residual PU, e'. The reconstructed PU, e', is then added to the corresponding prediction, x', either spatial or temporal, to form the new reconstructed PU, x". A loop filter 316 performs de-blocking on the reconstructed PU, x", to reduce blocking artifacts. Additionally, loop filter 316 may perform a sample adaptive offset process after the completion of the de-blocking filter process for the decoded picture, which compensates for a pixel value offset between reconstructed pixels and original pixels. Also, loop filter 306 may perform adaptive loop filtering over the reconstructed PU, which minimizes coding distortion between the input and output pictures. Additionally, if the reconstructed pictures are reference pictures, the reference pictures are stored in a reference buffer 318 for future temporal prediction.

Figure 3C:
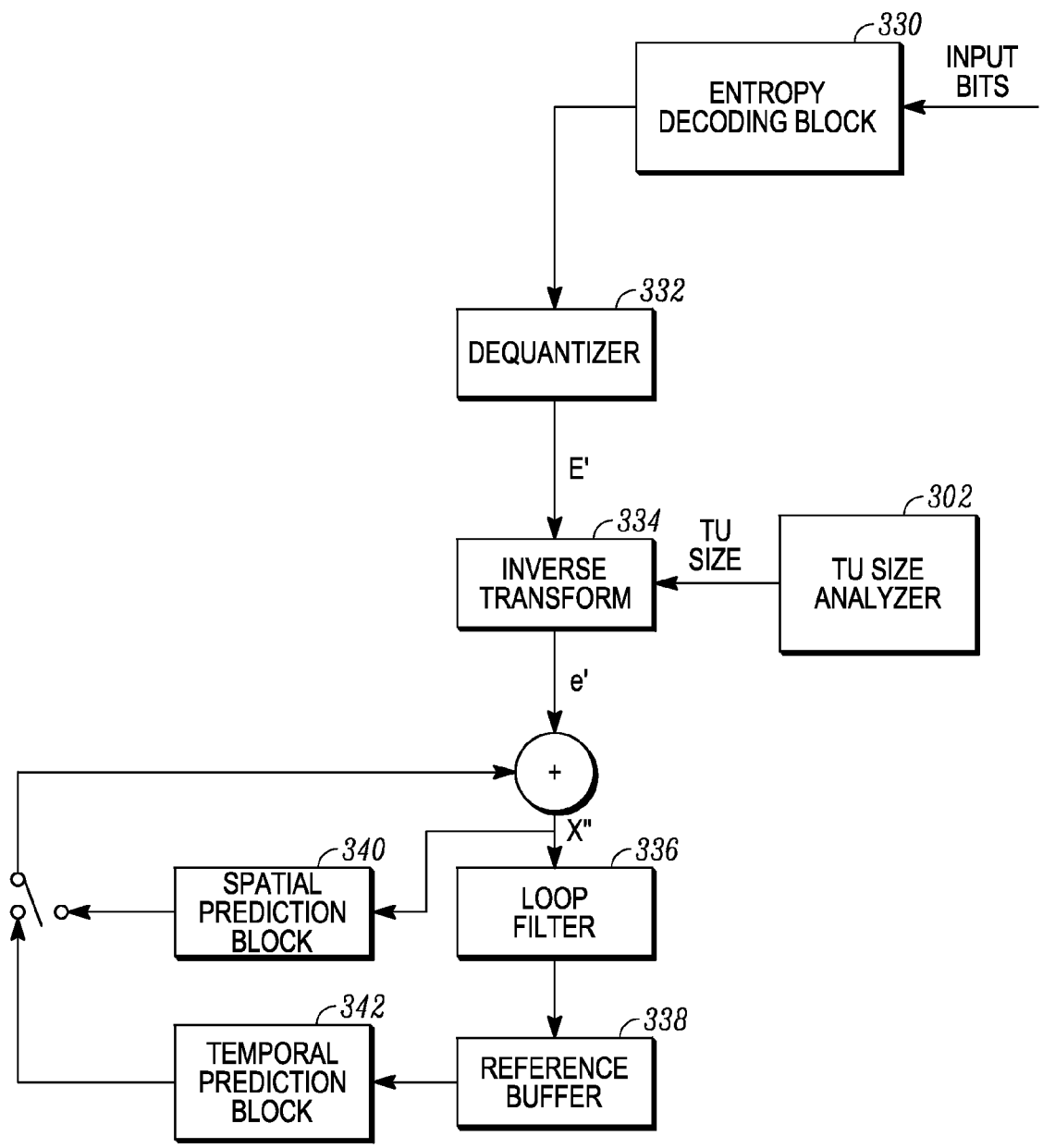
FIG. 3C depicts an example of a decoder according to one embodiment.

FIG. 3C depicts an example of decoder 301 according to one embodiment. A general operation of decoder 301 will now be described. It will be understood that variations on the decoding process described will be appreciated by a person skilled in the art based on the disclosure and teachings herein. Decoder 301 receives input bits from encoder 301 for encoded video content.

An entropy decoding block 330 performs entropy decoding on the input bitstream to generate quantized transform coefficients of a residual PU. A de-quantizer 332 de-quantizes the quantized transform coefficients of the residual PU. De-quantizer 332 then outputs the de-quantized transform coefficients of the residual PU, e'. An inverse transform block 334 receives the de-quantized transform coefficients, which are then inverse transformed resulting in a reconstructed residual PU, e'. TU size analyzer 302 is used to output a TU size to a transform block 306. TU size analyzer 302 receives a CU size and a PU type. The size of the CU and PU type is based on information in the bitstream being decoded. TU size analyzer 302 in decoder 301 performs the implicit determination similar to as described in the encoding process. In one embodiment, an RQT may not be used to determine the TU size.

The reconstructed PU, e', is then added to the corresponding prediction, x', either spatial or temporal, to form the new reconstructed PU, x". A loop filter 336 performs de-blocking on the reconstructed PU, x", to reduce blocking artifacts. Additionally, loop filter 336 may perform a sample adaptive offset process after the completion of the de-blocking filter process for the decoded picture, which compensates for a pixel value offset between reconstructed pixels and original pixels. Also, loop filter 336 may perform adaptive loop filtering over the reconstructed PU, which minimizes coding distortion between the input and output pictures. Additionally, if the reconstructed pictures are reference pictures, the reference pictures are stored in a reference buffer 338 for future temporal prediction.

The prediction PU, x', is obtained through either spatial prediction or temporal prediction. A spatial prediction block 340 may receive decoded spatial prediction directions per PU, such as horizontal, vertical, 45-degree diagonal, 135-degree diagonal, DC (flat averaging), and planar. The spatial prediction directions are used to determine the prediction PU, x'.

A temporal prediction block 342 performs temporal prediction through a motion estimation operation. A decoded motion vector is used to determine the prediction PU, x'. Interpolation may be used in the motion estimation operation.

Figures 4A, 4B, 4C:
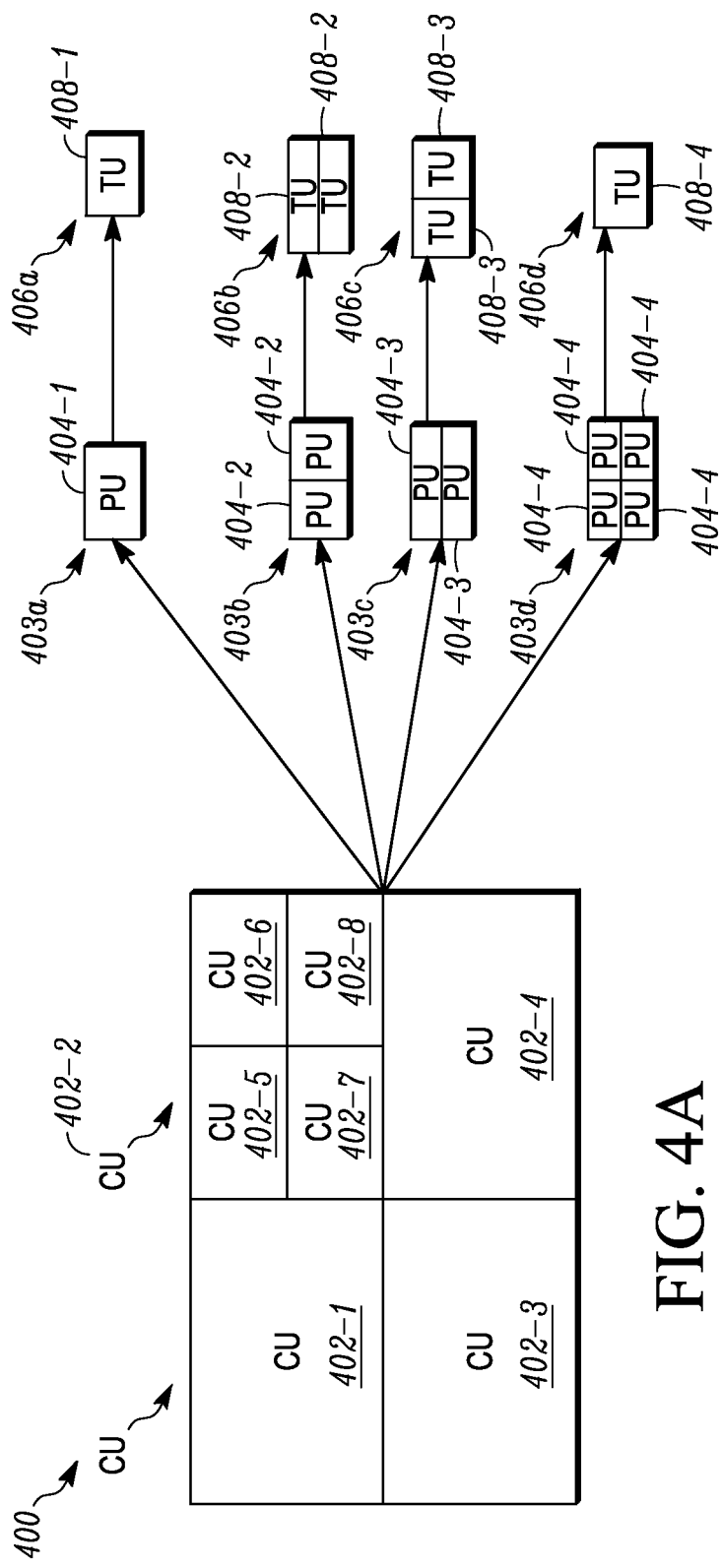
FIG. 4A shows an LCU is partitioned into CUs.
FIG. 4B shows four possible PU types for a given CU according to one embodiment.
FIG. 4C shows a first example of different TU sizes according to one embodiment.

Referring back to the TU size determination, TU size analyzer 302 may determine which TU size to use in the transform operation of transform block 306. FIGS. 4A-4C show an example of relationship between PU type and different types of TU sizes according to one embodiment. In FIG. 4A, an LCU 400 is partitioned into CUs 402. For example, LCU 400 is split into four CUs 402-1-402-4. Also, CU 402-2 is split into four CUs 402-5-402-8.

FIG. 4B shows four possible PU types for a given CU 402 according to one embodiment. For example, at 403a, a PU 404-1 is of the size 2N×2N, which means PU 404-1 is the same size as CU 402. At 403b, two PUs 404-2 are of the size 2N×N, which means PUs 404-2 are rectangular in shape and CU 402 has been vertically partitioned. At 403c, two PUs 404-3 are of the size N×2N, which means PUs 404-3 are rectangular in shape and CU 402 has been horizontally partitioned. At 403d, four PUs 404-4 are of the size N×N, which means PUs 404-4 are square in shape and a quarter of the size of CU 402. Different CUs 402 may contain different partitions of PU types.

Different TU sizes may be determined based on the PU type used. FIG. 4C shows a first example of different TU sizes according to one embodiment. The TU sizes shown in FIG. 4C are for one PU. At 406a, a TU 408-1 is equal to the size of PU 404-1. At 406b, two TUs 408-2 of a square shape may be included in a vertically partitioned PU 404-2. At 406c, two TUs 408-3 of a square shape may be included in a horizontally partitioned PU 404-3. At 406d, a single TU 408-4 may be the same size as a single PU, such as PU 404-4.

Figure 5:
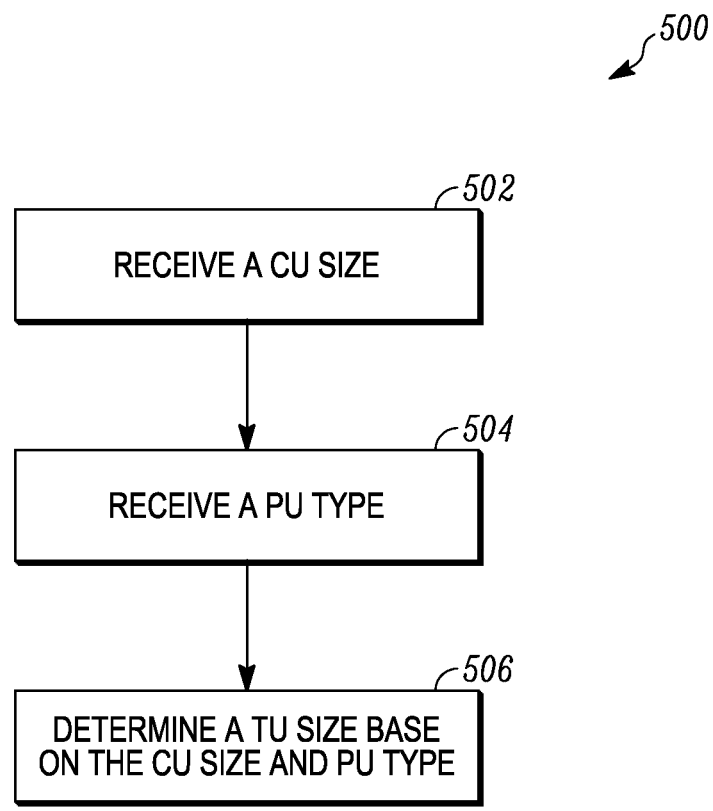
FIG. 5 depicts a simplified flowchart of a method for determining TU size according to one embodiment.

TU size analyzer 302 determines which of the above TU sizes should be used in a transform operation based on a function. FIG. 5 depicts a simplified flowchart 500 of a method for determining TU size according to one embodiment. The process described in FIG. 5 may be performed by encoder 300 and/or decoder 301. At 502, TU size analyzer 302 receives a CU size. The CU size may vary depending on the size of the LCU and the partitioning of an LCU. For example, a 64×64 LCU may result in four 32×32 CUs.

At 504, TU size analyzer 302 receives a PU type. For example, the PU type may be one of 2N×2N, 2N×N, N×2N, or N×N, which describe the shape of PU 408. The type may depend on if PU 408 is a square block or a rectangular block. Also, the type depends on the partitioning of PUs 408 within the CU 404, such as PU 408 may be the same size as CU 404, partitioned into 2 PUs 408, or partitioned into 4 PUs 408. As will be described below, a variable may be received that is derived based on PU type.

At 506, TU size analyzer 302 determines a TU size based on the CU size and PU type. For example, if CU size is 16×16 and the PU type is 2N×2N, then TU size may be 2N×2N=16×16. Also, if CU size is 16×16 and the PU type is N×N, then TU size may be N×N=8×8.

As described above, TU size analyzer 302 may use a function to determine the TU size. One embodiment of the function used by TU size analyzer 302 will be described; however, it will be understood that other functions may be used. In one example, TU analyzer 302 may use the function of:

size (TU)=size (CU)>>T, where >> is a right shift operation and T is a non-negative integer.

A right shift by one means that a size of the CU is partitioned one level. The right shift may shift a bit sequence to the right by one bit. A level of partitioning may be splitting a square block into four blocks. The T value may be based on PU type. The T value may be set to 0 if the CU has only one PU type of the same size 2N×2N. If the value of T is set to 0, then size (TU)=size (CU). This means that the size of TU 408 is the same size as CU 402. This may be similar to having an RQT with a tree depth equal to 1. That is, there is no splitting of PUs into multiple TUs.

The T value is set to 1 if CU 402 has more than one PU of a size 2N×N, N×2N, or N×N. The size of TU 408 is similar to TUs 408 shown in FIG. 4c at 406b and 406c, where the size of CU 402 has been split into four TUs 408 (the split is into two square TUs 408 per PU 404-2 resulting in four TUs in CU 402). Also, at 406d, CU 402 is split into four TUs 408-4 as each TU 408-4 is a same size as a corresponding PU 404-4.

Accordingly, the T value represents the level of partitioning for TU size within each CU. The T value may be defined at a sequence, picture, slice, LCU, or CU level. In one embodiment, only 1 bit needs to be encoded (e.g., the T value) to determine the TU size. Decoder 301 then uses the bit to determine the TU size implicitly without using an RQT. In another embodiment, encoder 300 and decoder 301 use rules to determine the T value separately. For example, the PU type is applied to the rule to determine the T value that is used.

Encoder 300 and decoder 301 may both include the function to determine the TU size. The 1 bit associated with the T value may be encoded and included in the compressed video or determined separately using rules. The decoder then uses the T value to determine the TU size based on the CU size and the T value. Accordingly, an overhead of 1 bit is used to determine the TU size instead of encoding the RQT data representation or the 1 bit may be saved using the rules. Further, the use of the function reduces the complexity for determining the TU size.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The instructions, when executed by one or more computer processors, may be operable to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents may be employed without departing from the scope of the invention as defined by the claims.

What is claimed is:

1. A method comprising:
receiving a size of a coding unit (CU) for a block of video content;
receiving information associated with a prediction unit (PU) type for a prediction unit of the coding unit;
applying, by a computing device, the size of the coding unit and the information associated with the prediction unit type to a function to determine a size of at least one transform unit for the prediction unit; and
outputting the size of the at least one transform unit for use in a transform operation.

2. The method of claim 1, wherein a residual quadtree representation (RQT) for a partitioning of transform units in the coding unit is not encoded and transmitted with compressed bitstream for the video content.

3. The method of claim 2, wherein the residual quadtree representation (RQT) for the partitioning of transform units in the coding unit is not used to decode the prediction unit.

4. The method of claim 1, wherein:
a variable value is derived from the PU type, and
the value is applied to the function to determine the size of the TU.

5. The method of claim 4, wherein:
the value is set to a first value if the CU includes one PU of a same size, and
the value is set to a second value if the CU includes more than one PU.

6. The method of claim 4, wherein:
the variable value is encoded with a compressed bitstream for the video content and sent to a decoder, and
the variable is received by the decoder and used to determine the TU size to use to decode the prediction unit.

7. The method of claim 4, wherein an encoder and a decoder determine the variable value separately using a rule.

8. The method of claim 4, wherein the TU size is determined based on the variable value and the size of the CU.

9. An apparatus comprising:
one or more computer processors; and
a computer-readable storage medium comprising instructions for controlling the one or more computer processors to be operable to:
receive a size of a coding unit (CU) for a block of video content;
receive information associated with a prediction unit (PU) type for a prediction unit of the coding unit;
apply the size of the coding unit and the information associated with the prediction unit type to a function to determine a size of at least one transform unit for the prediction unit; and
output the size of the at least one transform unit for use in a transform operation.

10. The apparatus of claim 9, wherein a residual quadtree representation (RQT) for a partitioning of transform units in the coding unit is not encoded and transmitted with a compressed bitstream for the video content.

11. The apparatus of claim 10, wherein the residual quadtree representation (RQT) for the partitioning of transform units in the coding unit is not used to decode the prediction unit.

12. The apparatus of claim 9, wherein:
a variable value is derived from the PU type, and
the value is applied to the function to determine the size of the TU.

13. The apparatus of claim 12, wherein:
the variable value is set to a first value if the CU includes one PU of a same size, and
the variable value is set to a second value if the CU includes more than more PU.

14. The apparatus of claim 12, wherein:
the variable value is encoded with a compressed bitstream for the video content and sent to a decoder, and
the variable is received by the decoder and used to determine the TU size to use to decode the prediction unit.

15. The apparatus of claim 14, wherein an encoder and a decoder determine the variable value separately using a rule.

16. The apparatus of claim 12, wherein the TU size is determined based on the variable value and the size of the CU.

17. A non-transitory computer-readable storage medium comprising instructions for controlling the one or more computer processors to be operable to:
receive a size of a coding unit (CU) for a block of video content;
receive information associated with a prediction unit (PU) type for a prediction unit of the coding unit;
apply the size of the coding unit and the information associated with the prediction unit type to a function to determine a size of at least one transform unit for the prediction unit; and
output the size of the at least one transform unit for use in a transform operation.

18. The non-transitory computer-readable storage medium of claim 17, wherein a residual quadtree representation (RQT) for a partitioning of transform units in the coding unit is not encoded and transmitted with the encoded video content.

19. The non-transitory computer-readable storage medium of claim 17, wherein:
a variable value is derived from the PU type, and
the value is applied to the function to determine the size of the TU.

20. The non-transitory computer-readable storage medium of claim 19, wherein:
the variable value is set to a first value if the CU includes one PU of a same size, and
the variable value is set to a second value if the CU includes more than more PU.

* * * * *